3,219,698
POLYHALOXYLENOL QUATERNARY
AMMONIUM SALTS
Benjamin D. Halpern, Jenkintown, Pa., and Jack Dickstein, Leominster, Mass., assignors to The Borden Company, a corporation of New Jersey
No Drawing. Filed Jan. 26, 1962, Ser. No. 169,092
2 Claims. (Cl. 260—576.6)

This invention relates to poly 2,6-xylenols containing substituted halogen and quaternary salts thereof. The invention is especially useful when the halogen represented in the polymer is bromine and will be first illustrated by description in connection therewith.

The invention provides making the said polymer by a conventional process so modified as to raise the softening point of the polymer obtained to about 370° C. or even higher.

Briefly stated the invention comprises the oxidation in alkaline medium of 4-halo-2,6-xylenol in intimate contact with an alcohol solvent.

The 4-bromo-2,6-xylenol is selected as the haloxylenol because of its rapid rate of reaction in the condensation. Another halo compound that may be used is 4-chloro-2,6-xylenol.

The alkali used as the acid acceptor is ordinarily sodium hydroxide. Lithium, potassium or ammonium hydroxide may be used but they provide no particular advantage to offset the higher costs.

The oxidizing condensation agent is one conventionally used in liberating hydrogen haloacid, e.g., HCl or HBr, from halo aromatics during condensation. Examples of these agents are potassium or sodium ferricyanide, potassium or sodium persulfate and peracetic acid. Potassium ferricyanide works particularly well and is ordinarily selected for this purpose.

As the solvent for the materials entering into the reaction, we use a water soluble organic hydroxy compound, that is an alcohol, as for instance a $C_1$–$C_4$ aliphatic alcohol such as methanol, ethanol, isopropanol, and t-butanol; ethylene glycol, propylene glycol, the mono $C_1$–$C_3$ alkyl ethers thereof; and polyglycols that are water soluble. Methanol is economical, a satisfactory solvent, and the one recommended.

As to proportions, we use the methanol or other alcohol in amount to make the resulting aqueous mixture a solvent for the haloxylenol, e.g., 1–10 parts for 1 part of the haloxylenol.

We use at least approximately 2 moles of the alkali for 1 mole of the haloxylenol. Alkali in this amount accepts the acid liberated during the reaction and leaves the second mole or equivalent to solubilize the haloxylenol in the water-alcohol solution, before and during polymerization. This effect brings the haloxylenol into intimate contact with the catalyst. The ferricyanide or like oxidation agent is used in amount to initiate liberation of hydrogen bromide, as in the proportion of about 10%–25% of the ferricyanide on the weight of the haloxylenol.

As to conditions, the selected haloxylenol, the alkali, the oxidizer constituting the condensation agent, and the solvent are dissolved in water at the start of the condensation. The resulting solution is maintained at low temperatures to avoid the reaction's becoming too violent. The whole is stirred at temperatures maintained at above the freezing and not above the boiling points about 5°–50° C. until there is no further substantial neutralization of the alkali, as determined by titration. The resulting mixture is then extracted with benzene or like water-insoluble liquid that is a solvent for the polymerized haloxylenol so produced. The polymer is recovered from the extract as described below or by any other technique used for recovery of this class of materials.

The invention will be further illustrated by description in connection with the following specific examples, proportions here and elsewhere herein being expressed as parts by weight unless specifically stated to the contrary.

EXAMPLE 1

*Preparation of 4-bromo-2,6-xylenol*

2,6-xylenol (346 g., about 2.8 moles) was dissolved in 710 ml. glacial acetic acid. The solution was cooled to 7° C. A solution of 454 g. bromine (about 2.8 moles of $Br_2$) in 710 ml. glacial acetic acid was rapidly added while the mixture was constantly stirred and maintained between 7° and 12° C. in a Dry Ice-alcohol bath.

A solution of 37 g. sodium bisulfite, to combine with any remaining bromine, was added in 1700 ml. water with stirring. The 4-bromo-2,6-xylenol so precipitated was isolated by filtration and washed thoroughly on the filter with water. This brominated xylenol was then recrystallized from hot hexane to yield 375 g. (66% yield) of product in the form of long white needles, of M.P. 76°–78° C. (Beilstein gives 79.5°).

*Polymerization of 4-bromo-2,6-xylenol*

Polymers of 4-bromo-2,6-xylenol of high melting point were prepared by oxidation in an aqueous alcoholic solution as follows:

4-bromo-2,6-xylenol (100 parts) was dissolved in 800 parts methanol. A solution of 56 parts sodium hydroxide in 500 parts water was admixed with stirring. Nitrogen gas was bubbled in for 15 minutes to replace air. With continued nitrogen bubbling, a solution of 16.5 parts potassium ferricyanide in 100 parts water was rapidly added, the temperature being maintained at about 5°–10° C. The reaction mixture was then stirred for 1 hour.

The thus oxidized mixture was transferred to a separatory funnel. The resulting poly(2,6-xylenol) was extracted with several portions of benzene of 150 parts each. The combined benzene extracts were washed twice with aqueous 5% hydrochloric acid solution, evaporated on the steam bath to a third its original volume, and then poured into 1,600 parts methanol. The precipitated polymer was filtered, washed twice with a dilute methanolic hydrochloric acid solution and twice with methanol. The polymer was dried in a vacuum oven at 50° overnight. The yield was 53 parts (88% of theory).

ANALYSIS

C _____percent__ 77.23
H _____do____ 6.40
Br _____do____ 1.41
M. wt. _____ 5700

For comparison, the 800 parts methanol were replaced at the same stage by an equal weight of benzol. A polymer of much lower softening point resulted. With the benzene and methanol both omitted and an alkaline aqueous solution used as suspending medium, the softening point of the polymer made was as low as 130° C.

The table in column 132 shows comparisons and results illustrating the invention. Columns 130 and 131 do not represent a part of the invention.

|  | 130 | 131 | 132 |
|---|---|---|---|
| 4-bromo-2, 6-xylenol, g | 10 | 10 | 10 |
| 12% sodium hydroxide, ml | 53 | 53 | 53 |
| $K_3Fe(CN)_6$, g | 1.65 | 8.3 | 1.65 |
| Benzene, ml |  | 100 |  |
| Methanol, ml |  |  | 100 |
| Temp., °C | 29 | 35 | 25 |
| Agitation | fast | fast | fast |
| Bromine in Polymer, % | 8 | 1.49 | 0.3 |
| Softening point, °C | 130 | 220 | about 370 |
| Molecular wt., mean | 1,000 | 5,900 | 27,000 |

The composition of column 132 of very high softening point, when used to make a molded plastic, gave a non-brittle product characteristic of high molecular weight polymers.

EXAMPLE 2

The procedure of Example 1 and the composition of column 132 of the table, are used except that the bromoxylenol is replaced by an equimolar weight of 4-chloro-2,6-xylenol.

EXAMPLE 3

The procedure of Example 1 and the composition of column 132, of the table are used except that the sodium hydroxide is replaced by an equimolar proportion of lithium, potassium or ammonium hydroxide.

EXAMPLE 4

The procedure of Example 1 and the composition of column 132 thereof are used except that the potassium ferricyanide is replaced by an equal weight of any of the other oxidizing agents disclosed herein.

EXAMPLE 5

*Bromination of side chains of poly-2,6-xylenol*

Poly-2,6-xylenol made as described above (25 g.), benzoyl peroxide (0.5 g.), and benzene (130 g.) were placed in a 500 ml. 3-necked flask equipped with a stirrer, reflux condenser and thermometer. The solution was brought to a boil. An intimate mixture of 80 g. N-bromosuccinimide and 0.5 g. benzoyl peroxide was added over a 20 minute period. The mixture was refluxed for 20 minutes and filtered. The precipitate was washed several times with benzene. The combined filtrate and washings were dried over anhydrous potassium sulfate and poured into 1 liter methanol. The slightly-brownish product was isolated by filtration, washed with methanol, and dried at 50° under vacuum. Softening pt.=205° C. and percent Br=22.0 (about 0.4 $CH_2$-Br groups per repeating unit).

In a modification of this example, the appropriate chloro and iodosuccinimides are substituted for the bromosuccinimide in equimolar quantities to prepare the chloromethyl and iodomethyl derivatives.

EXAMPLE 6

*Quaternary ammonium salts*

Quaternary ammonium salts are made by the direct addition of a mole of a tertiary amine with a mole of any of the polyhaloxylenols made in Example 5. The reaction by which these quaternary ammonium salts are made is illustrated by the following equation, R being any $C_1$–$C_{18}$ alkyl, $n$ is an integer, suitably within the range 5 to 300, and X being Cl, Br, or I.

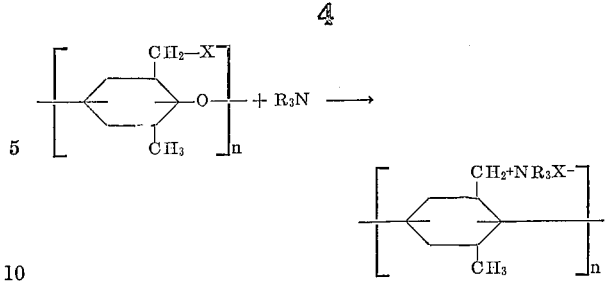

We introduce ordinarily only 1–4 and suitably 1–2 bromine atoms for every 6 original methyl groups, i.e., for 3 of the repeating monomeric units.

The amine and haloxylenol are used in approximately equivalent proportions, that is, one mole of the amine for each atom of halogen in the haloxylenol.

Examples of making specific quaternary salts in this manner follow.

(a) A tetraalkyl ammonium salt was prepared on microscale by the freeze-dry system. 1.063 g. of the product of bromination of polyxylenol (mean M.W. 7200 containing about 0.4 Br to each monomeric unit) was dissolved in 9 ml. benzene in a 50 ml. round bottom flask. 0.3 gram of triethyl amine was added and the flask contents gently heated to about 50° C. for one half hour. A gelatinous precipitate formed. The contents were cooled in a Dry Ice bath while being rotated, to give finely divided crystals, the flask removed from the bath and the contents thereof quickly evaporated at 0.25 mm. until free of all solvent. The hard, horny product analyzed 1.78% nitrogen. It was insoluble in all solvents tried and infusible on a 370° C. surface of a hot plate.

(b) 0.5 ml. of bromopolyxylenol (prepared from polyxylenol of mean M.W. 7200) was dissolved in 10 ml. benzene. Three ml. of a benzene solution of trimethyl amine (containing 0.9 gram trimethyl amine) were added under good agitation at room temperature. The precipitate immediately produced was filtered, washed with benzene and dried. The product was soluble in water but insoluble in benzene and solvents of intermediate polarity. It did not melt at 370° C.

(c) When two amines were intimately mixed in the proportion 0.25 to 0.5 part with 1 part of bromopolyxylenol and then spread on a hot plate at 230° C. surface temperature, the resulting composition set up quickly to give infusible gels. The amines used were triethylene tetramine, Duomene S (aminopropyl soya fatty acids amine) and Armeen 2HT (secondary $C_6$–$C_{18}$) p-diamine. In all cases gelation occurred very fast, before the mixture could completely fuse on the hot plate.

(d) A low molecular weight bromopolyxylenol (prepared from polyxylenol of mean M.W. 4800 containing 1.7% Br) was intimately mixed with p-phenylene diamine in the proportion of 12 parts to 1 by codissolving the two in chloroform and evaporating the resulting mixture to dryness under mixing. The dried composition molded on the hot plate and underwent momentary fluxing, to give a stiff rather tough thermoset product.

In modifications of this example other volatilizable organic liquids that are solvents for the polyxylenol are substituted in equal proportion by weight for the benzene, e.g., toluene, hexane, or ethylene dichloride.

In other modifications, poly(4-bromo-2,6-xylenol) and the corresponding nuclear-substituted chloro compound are used in equal proportions by weight in place of the alkylbrominated materials used above.

The final products made as described in Examples 1–4 are useful as high temperature adhesives. They are useful also for molding plastics. Such products are transparent and have tensile strengths of around 2,000–2,500 p.s.i.

The quaternary salts of Example 5 are useful as surfactants.

It will be understood that it is intended to cover all changes and modifications of the examples of the invention herein chosen for the purpose of illustration which do not constitute departures from the spirit and scope of the invention.

We claim:
1. A polyhaloxylenol of the formula

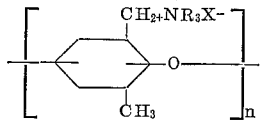

R being a $C_1$–$C_{18}$ alkyl group and $n$ being an integer within the range 5–300, and X being a halogen selected from the group consisting of chlorine, bromine and iodine, wherein the proportion of substituent groups of said polyhaloxylenol is between 1-4 —$CH_2{}^+NR_3X^-$ groups for 6 of the —$CH_2{}^+NR_3X^-$ groups plus —$CH_3$ groups in said polyhaloxylenol.

2. The polyhaloxylenol of claim 1, X being bromine.

References Cited by the Examiner
UNITED STATES PATENTS

| | | | |
|---|---|---|---|
| 2,499,213 | 2/1950 | De Benneville | 260—567.6 X |
| 2,499,214 | 2/1950 | De Benneville | 260—567.6 X |
| 2,649,436 | 8/1953 | Bock et al. | 260—47 |
| 2,880,239 | 3/1959 | Semmens et al. | 260—567.6 |
| 2,933,529 | 4/1960 | Hwa | 260—567.6 |
| 3,025,264 | 3/1962 | Lind | 260—47 |

FOREIGN PATENTS

| | | |
|---|---|---|
| 165,408 | 9/1922 | Great Britain. |
| 651,433 | 4/1951 | Great Britain. |
| 871,078 | 6/1961 | Great Britain. |

OTHER REFERENCES

Hay et al.: J.A.C.S., vol. 81, pp. 6335–6336 (1959).
Staffin et al.: J.A.C.S., vol. 82, pp. 3632–3634 (1960).
Staffin et al.: Rubber World, vol. 139, p. 408 (1958).

CHARLES B. PARKER, *Primary Examiner.*
LEON ZITVER, JOSEPH P. BRUST, *Examiners.*